(12) United States Patent
Dorfman et al.

(10) Patent No.: US 9,573,438 B2
(45) Date of Patent: Feb. 21, 2017

(54) POLYMER THICK FILM POSITIVE TEMPERATURE COEFFICIENT CARBON COMPOSITION

(71) Applicant: E I DU PONT DE NEMOURS AND COMPANY, Wilmington, DE (US)

(72) Inventors: Jay Robert Dorfman, Durham, NC (US); Vince Arancio, Bristol (GB)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 977 days.

(21) Appl. No.: 13/859,843

(22) Filed: Apr. 10, 2013

(65) Prior Publication Data

US 2014/0305923 A1    Oct. 16, 2014

(51) Int. Cl.
| | |
|---|---|
| B60H 1/00 | (2006.01) |
| B05D 5/12 | (2006.01) |
| H01C 7/00 | (2006.01) |
| B60N 2/56 | (2006.01) |
| B60R 1/06 | (2006.01) |
| H01B 1/24 | (2006.01) |
| H05B 3/84 | (2006.01) |
| H05B 3/14 | (2006.01) |
| C08K 3/04 | (2006.01) |

(52) U.S. Cl.
CPC ............ *B60H 1/00271* (2013.01); *B05D 5/12* (2013.01); *B60H 1/00285* (2013.01); *B60N 2/5685* (2013.01); *B60R 1/0602* (2013.01); *H01B 1/24* (2013.01); *H01C 7/005* (2013.01); *H05B 3/145* (2013.01); *H05B 3/845* (2013.01); *C08K 3/04* (2013.01); *H05B 2203/013* (2013.01); *H05B 2203/02* (2013.01); *H05B 2203/029* (2013.01)

(58) Field of Classification Search
CPC combination set(s) only.
See application file for complete search history.

(56) References Cited

U.S. PATENT DOCUMENTS

| | | | |
|---|---|---|---|
| 3,878,362 A | 4/1975 | Stinger | |
| 3,900,654 A | 8/1975 | Stinger | |
| 5,093,036 A * | 3/1992 | Shafe | H05B 3/146 252/511 |
| 5,181,006 A * | 1/1993 | Shafe | H05B 3/146 219/219 |
| 5,714,096 A | 2/1998 | Dorfman | |
| 5,985,182 A * | 11/1999 | Zhao | H01C 7/027 252/511 |
| 6,090,313 A * | 7/2000 | Zhao | H01C 7/027 252/500 |
| 8,093,328 B2 | 1/2012 | Arancio et al. | |
| 2002/0094441 A1 | 7/2002 | Korzhenko et al. | |
| 2003/0091829 A1* | 5/2003 | Handa | C08K 3/08 428/413 |
| 2005/0062023 A1 | 3/2005 | Korzhenko et al. | |
| 2007/0072975 A1* | 3/2007 | Chandler | C08K 3/08 524/407 |
| 2013/0193384 A1 | 8/2013 | Dorfman | |

FOREIGN PATENT DOCUMENTS

| | | |
|---|---|---|
| EP | 0 074 281 A1 | 3/1983 |
| EP | 0074281 A1 | 3/1983 |

OTHER PUBLICATIONS

International Preliminary Report on Patentability Dated Oct. 13, 2015 for International Patent Application No. PCT/US2014/033249.
International Search Report and Written Opinion (PCT/US2014/033249—Filed Apr. 8, 2014).
U.S. Appl. No. 13/362,065, Jan. 31, 2012, Dorfman.

* cited by examiner

*Primary Examiner* — Quang D Thanh
*Assistant Examiner* — Renee Larose

(57) ABSTRACT

The invention is directed to a polymer thick film positive temperature coefficient carbon resistor composition consisting essentially of:
(a) organic medium consisting of:
   (i) a fluoropolymer resin consisting of a copolymer of vinylidene difluoride and hexafluoropropylene; and
   (ii) an organic solvent consisting of triethyl phosphate; and
(b) conductive carbon powder. The composition may be processed at a time and temperature necessary to remove all solvent.

The invention is further directed to positive temperature coefficient (PTC) circuits comprising the composition of the invention which has been dried to remove the solvent and to articles, e.g., mirror heaters and seat heaters, containing such PTC circuits as well as a method for making such PTC circuits.

16 Claims, No Drawings

POLYMER THICK FILM POSITIVE TEMPERATURE COEFFICIENT CARBON COMPOSITION

FIELD OF THE INVENTION

This invention is directed to a polymer thick film (PTF) positive temperature coefficient (PTC) carbon resistor composition for use in self-regulating heater circuits. Such a composition can be used as a screen-printed layer on a PTF silver conductor composition.

BACKGROUND OF THE INVENTION

It is well known in the art that the electrical properties of conductive polymers frequently depend upon their temperature. A very small proportion of conductive polymers exhibit a positive temperature coefficient (PTC), i.e., rapid increase in resistivity at a particular temperature or over a particular temperature range. Materials exhibiting PTC behavior are useful in a number of applications in which the size of the current passing through a circuit is controlled by the temperature of a PTC element forming part of the circuit.

PTC circuits are typically used as self-thermostating circuits such as in mirror heaters and seat heaters found in automobiles and the like. They are used in place of an external thermostat. Although they have been used for years in these types of applications, the PTC circuits typically have problems such as resistance shift stability, powered on/off cycling inconsistency, and sensitivity to the adhesive used in the fabrication. All these issues can and do have a negative impact on a functional PTC circuit. It is the purpose of this invention to help alleviate these issues and thus help produce a more efficient and reliable PTC circuit.

SUMMARY OF THE INVENTION

The invention is directed to a polymer thick film positive temperature coefficient carbon resistor composition, consisting essentially of:
 (a) 50 to 99 weight percent organic medium, consisting of:
  a fluoropolymer resin consisting of a copolymer of vinylidene difluoride and hexafluoropropylene; and
  (ii) an organic solvent consisting of triethyl phosphate, wherein the fluoropolymer resin is 10 to 50 weight percent of the total weight of the organic medium and is dissolved in the organic solvent; and
 (b) 1 to 50 weight percent conductive carbon powder, wherein the conductive carbon powder is dispersed in the organic medium and wherein the weight percent of the organic medium and the conductive carbon powder are based on the total weight of the polymer thick film positive temperature coefficient carbon resistor composition.

The composition may be processed at a time and temperature necessary to remove all solvent.

The invention is further directed to PTC circuits comprising the composition of the invention which has been dried to remove the solvent, to a method for the formation of such PTF circuits and to articles, e.g., mirror heaters and seat heaters, containing such PTC circuits.

DETAILED DESCRIPTION OF INVENTION

The invention describes a polymer thick film positive temperature coefficient carbon resistor composition for use in PTC heating circuits. It is typically used so as to provide heating of the total circuit. A layer of encapsulant is sometimes printed and dried on top of the active PTC carbon resistor.

The fluoropolymer resin used in this invention is a copolymer (VF2/HFP) of vinylidene difluoride (VF2) and hexafluoropropylene (HFP). This fluoropolymer resin provides paste with improved resistivity shifts compared with other fluoropolymers tested. The solvent used is triethyl phosphate. The combination of the fluoropolymer resin (VF2/HFP) and the triethyl phosphate solvent provides a carbon resistor with even lower resistivity shift and a paste with an improvement in stability.

Generally, a thick film composition comprises a functional phase that imparts appropriate electrically functional properties to the composition. The functional phase comprises electrically functional powders dispersed in an organic medium that acts as a carrier for the functional phase. Generally, the composition is fired to burn out the organics and to impart the electrically functional properties. However, in the case of polymer thick film compositions, the polymer or resin component remains as an integral part of the composition after drying and the removal of the solvent.

The main component of a thick film encapsulant composition is an organic medium which includes polymer resin and solvent.

The components of the polymer thick film positive temperature coefficient carbon resistor composition are discussed below.

Organic Medium

The polymer resin is added to a solvent to produce an "organic medium" having suitable consistency and rheology for printing. The organic medium must be one in which the solids are dispersible with an adequate degree of stability. The rheological properties of the medium must be such that they lend good application properties to the composition. Such properties include: dispersion of solids with an adequate degree of stability, good application of composition, appropriate and relatively stable viscosity, thixotropy, appropriate wettability of the substrate and the solids, a good drying rate, and a dried film strength sufficient to withstand rough handling.

The fluoropolymer resin (VF2/HFP) used in this invention is a copolymer of vinylidene difluoride (VF2) and hexafluoropropylene (HFP) and imparts important properties to the PTC composition. Specifically, the solubility of the resin in the solvent and the temperature stability found were different compared with those of other fluoropolymers tested. The copolymer of vinylidene difluoride and hexafluoropropylene helps achieve both good adhesion to both the PTF silver layer and underlying substrate and is compatible with, and thus will not adversely affect, the PTC performance, two critical properties for PTC circuits. In an embodiment, this fluoropolymer resin may be 10 to 50 eight percent (wt %), 25 to 45 wt %, or 30 to 40 wt % of the total weight of the organic medium.

The solvent used in the polymer thick film positive temperature coefficient carbon resistor composition is triethyl phosphate.

The resistivity shift with time of a PTC circuit containing the PTF PTC composition of the invention was greatly reduced and the viscosity of the composition showed less change with time.

The PTF PTC composition of the invention has 50 to 99 weight percent organic medium. In one embodiment, the PTF PTC composition of the invention has 80 to 95 weight percent organic medium.

Conductive Powder

The conductive powder used in the PTF PTC composition of the invention is conductive carbon or carbon black which is required to achieve the target resistance (1-50 Kohm/sq) and the desired PTC effect. Other carbon powders and/or graphite may be used. Common conductive powders such as silver and gold may also be used in combination with the carbon powder.

The PTF PTC composition of the invention has 1 to 50 weight percent conductive carbon powder, In one embodiment, the PTF PTC composition of the invention has 5 to 20 weight percent conductive carbon powder.

Application of Thick Films

The polymer thick film composition also known as a "paste" is typically deposited on a substrate, such as polyester, that is impermeable to gases and moisture. The substrate can also be a sheet of a composite material made up of a combination of plastic sheet with optional metallic or dielectric layers deposited thereupon.

The deposition of the PTF PTC composition is performed preferably by screen printing, although other deposition techniques such as stencil printing, syringe dispensing or other coating techniques can be utilized. In the case of screen-printing, the screen mesh size controls the thickness of deposited thick film.

The deposited thick film is dried, i.e., the solvent is removed, by exposure to heat for typically 10 to 15 min at 140° C.

In one embodiment, the PTF PTC carbon resistor composition is used as a screen-printed layer on top of a PTF silver composition such as DuPont 5064 silver conductive ink (DuPont Co., Wilmington, Del.).

The present invention will be discussed in further detail by giving a practical example. The scope of the present invention, however, is not limited in any way by this practical example.

EXAMPLE 1 AND COMPARATIVE EXPERIMENTS A & B

Comparative Experiment A

A PTF PTC carbon resistor composition (paste) was prepared by first preparing the organic medium as follows: 25.0 wt % copolymer of vinylidene difluoride and hexafluoropropylene resin (Kynar$^R$ ADS2 Arkema Inc. King of Prussia, Pa.) was mixed with 75.0 wt % dibasic esters DBE™-9 (Invista™, Wilmington, Del.) organic solvent. The molecular weight of the resin was approximately 20,000. The above mixture was heated at 90° C. for 1-2 hours to dissolve all the resin and form the organic medium. Conductive carbon black Monarch® 120 (Cabot Corp., Boston, Mass.) was then added to the organic medium.

The PTF PTC carbon resistor composition was:

82.72% Organic Medium
8.18 Conductive Carbon Black Powder
9.10 DBE™-9 Solvent

This composition was mixed for 30 minutes on a planetary mixer. The composition was then transferred to a three-roll mill where it was subjected to one pass at 0 psi and one pass at 150 psi. The result was a PTF PTC carbon resistor composition.

A circuit was then fabricated as follows: Using a 280 mesh stainless steel screen, a series of interdigitated silver lines were printed on a polyester substrate using DuPont 5064 silver conductive ink (DuPont Co., Wilmington, Del.). This silver conductor was dried at 140° C. for 15 min in a forced air box oven. Next, the PTC circuit pattern of interdigitated lines made with the above PTF PTC carbon resistor composition was printed on top of the silver conductor. It was then dried at 140° C. for 15 min in a forced air box oven to form a PTC circuit.

The resistance of the PTC circuit was measured and then measured again 30 days later. The percent shift in resistance was calculated and is shown in Table I. The viscosity of the PTF PTC carbon resistor composition was measured and then measured again 30 days later. The percent change in viscosity was calculated and is shown in Table I.

Comparative Experiment B

A PTC circuit was produced essentially as described above in Comparative Experiment A. The only difference from Comparative Experiment A was the use of the DuPont 7282 Carbon Resistor Thick Film Composition (DuPont Co., Wilmington, Del.) instead of the PTF PTC carbon resistor composition of Comparative Experiment A.

The resistance of the PTC circuit was measured and then measured again 30 days later. The percent shift in resistance was calculated and is shown in Table I. The viscosity of the PTF PTC carbon resistor composition was measured and then measured again 30 days later. The percent change in viscosity was calculated and is shown in Table I.

Example 1

A PTC circuit was produced essentially as described above in Comparative Experiment A. The only difference from Comparative Experiment A was the use of a PTF PTC carbon resistor composition of the invention instead of the PTF PTC carbon resistor composition of Comparative Experiment A. The PTF PTC carbon resistor composition of the invention was made using 92.0 weight percent organic medium and 8.0 weight percent conductive carbon powder. The organic medium consisted of 35 weight percent copolymer of vinylidene difluoride and hexafluoropropylene resin (Kynar$^R$ ADS2 Arkema Inc. King of Prussia, Pa.) and 65 weight percent triethyl phosphate. The difference being that triethyl phosphate was used as the solvent rather than the dibasic esters DBE™-9 of Comparative Experiment A.

The resistance of the PTC circuit was measured and then measured again 30 days later. The percent shift in resistance was calculated and is shown in Table I. The viscosity of the PTF PTC carbon resistor composition was measured and then measured again 30 days later. The percent change in viscosity was calculated and is shown in Table I.

TABLE I

|  | Resistance Shift After 30 Days | Viscosity Change After 30 Days |
| --- | --- | --- |
| Comparative Experiment A | 12.5% | 220% |
| Comparative Experiment B | 40.0% | 280% |
| Example 1 | 4.2% | 50% |

What is claimed is:

1. A polymer thick film positive temperature coefficient carbon resistor composition, consisting essentially of:
   (a) 50 to 99 weight percent organic medium, consisting of:
      (i) a fluoropolymer resin consisting of a copolymer of vinylidene difluoride and hexafluoropropylene; and
      (ii) an organic solvent consisting of triethyl phosphate, wherein the fluoropolymer resin is 10 to 50 weight percent of the total weight of the organic medium and is dissolved in the organic solvent; and (b) 1 to 50 weight percent conductive carbon powder, wherein the conductive carbon powder is dispersed in the organic medium and wherein the weight percent of the organic medium and the conductive carbon powder are based on the total weight of the polymer thick film positive temperature coefficient carbon resistor composition.

2. The polymer thick film positive temperature coefficient carbon resistor composition of claim 1, wherein the conductive carbon powder is conductive carbon black powder.

3. The polymer thick film positive temperature coefficient carbon resistor composition of claim 1, wherein the fluoropolymer resin is 30 to 40 weight percent of the total organic medium.

4. The polymer thick film positive temperature coefficient carbon resistor composition of claim 1, wherein the organic medium is 80 to 95 weight percent of the total polymer thick film positive temperature coefficient carbon resistor composition.

5. A positive temperature coefficient circuit comprising the polymer thick film positive temperature coefficient carbon resistor composition of claim 1, wherein the polymer thick film positive temperature coefficient carbon resistor composition has been dried to remove the solvent.

6. The positive temperature circuit of claim 5, wherein the conductive carbon powder is carbon black powder.

7. An article containing the positive temperature circuit of claim 5.

8. The article of claim 7, wherein the conductive carbon powder is carbon black powder.

9. The article of claim 7 in the form of a mirror heater.

10. The article of claim 7 in the form of a seat heater.

11. The article of claim 8 in the form of a mirror heater.

12. The article of claim 8 in the form of a seat heater.

13. A method for the formation of a PTC circuit, the method comprising providing a substrate and depositing the polymer thick film positive temperature coefficient carbon resistor composition of claim 1 onto the substrate, wherein the polymer thick film positive temperature coefficient carbon resistor composition has been dried to remove the solvent.

14. The method of claim 13, wherein the substrate contains a dried PTF silver composition.

15. The method of claim 13, wherein the conductive carbon powder is carbon black powder.

16. The method of claim 14, wherein the conductive carbon powder is carbon black powder.

* * * * *